US011953869B2

(12) United States Patent
Wagner

(10) Patent No.: US 11,953,869 B2
(45) Date of Patent: Apr. 9, 2024

(54) MODULAR LOAD CONTROL

(71) Applicant: Joerg Wagner, Kelowna (CA)

(72) Inventor: Joerg Wagner, Kelowna (CA)

( * ) Notice: Subject to any disclaimer, the term of this patent is extended or adjusted under 35 U.S.C. 154(b) by 264 days.

(21) Appl. No.: 17/240,872

(22) Filed: Apr. 26, 2021

(65) Prior Publication Data
US 2021/0247728 A1   Aug. 12, 2021

Related U.S. Application Data

(63) Continuation of application No. 15/567,876, filed as application No. PCT/US2016/024063 on Mar. 24, 2016, now Pat. No. 11,016,451.

(60) Provisional application No. 62/137,643, filed on Mar. 24, 2015.

(51) Int. Cl.
  *H04L 12/28*    (2006.01)
  *G05B 15/02*    (2006.01)
  *H02J 13/00*    (2006.01)
  *H05B 47/155*   (2020.01)
  *H05B 47/175*   (2020.01)

(52) U.S. Cl.
CPC .............. *G05B 15/02* (2013.01); *H02J 13/00* (2013.01); *H04L 12/2816* (2013.01); *H05B 47/155* (2020.01); *H05B 47/175* (2020.01)

(58) Field of Classification Search
CPC ...... G05B 15/02; H02J 13/00; H04L 12/2816; H04L 12/28; H05B 47/155; H05B 47/175; H05B 44/00; G06F 3/04886
See application file for complete search history.

(56) References Cited

U.S. PATENT DOCUMENTS

| | | | |
|---|---|---|---|
| 6,236,622 B1 * | 5/2001 | Blackman | G04G 13/023 368/79 |
| 10,076,014 B2 * | 9/2018 | Kelly | H05B 47/19 |
| 2009/0206769 A1 * | 8/2009 | Biery | H05B 39/08 315/158 |
| 2009/0239587 A1 * | 9/2009 | Negron | H04L 12/2836 455/566 |
| 2014/0055041 A1 * | 2/2014 | Ramer | H05B 47/175 315/153 |
| 2014/0277805 A1 * | 9/2014 | Browne, Jr. | H04L 12/2807 315/291 |

\* cited by examiner

*Primary Examiner* — Mohammad Ali
*Assistant Examiner* — Sheela Rao

(57) ABSTRACT

Representative implementations of devices and techniques provide local and/or remote control for one or more connected loads or remote appliances. A load control device includes controls for switching and varying the power to associated loads and also includes communication components for remote operations. A user interface device includes a configurable and user customizable interface to communicate control instructions to the load control device. The load control device and the user interface device may be installed as a single unit, mechanically and electrically coupled together, or they may be installed remote from each other. Accordingly, the load control device and the user interface device include wired and wireless communication capabilities.

9 Claims, 14 Drawing Sheets

MODULAR LOAD CONTROL

PRIORITY CLAIM AND CROSS-REFERENCE TO RELATED APPLICATION

This application is a continuation of U.S. patent application Ser. No. 15/567,876, filed Oct. 19, 2017, which claims the benefit under 35 U.S.C. § 119(e)(1) of U.S. Provisional Application No. 62/137,643, filed Mar. 24, 2015, both of which are hereby incorporated by reference in their entirety.

BACKGROUND

Remote control of appliances, such as lamps or fans, for example, often includes turning the appliance power on or off with a timer, remote switching device, or the like. In some cases, this is done by switching the power at the outlet feeding the appliance, or by switching the power coming from the outlet. For example, a timer or switching device may be plugged into the outlet, and the appliance may be plugged into the timer or switching device. Alternately, the switching device may include dimming capability via a remote component. However, many such applications result in multiple cords associated with a single appliance.

Home automation devices may also be plugged into a power outlet, and desired appliances plugged into receptacles in these devices. The home automation devices may be controlled remotely to switch the power to the connected appliance(s). In many cases, however, installation of remote control or automation devices and systems can be complicated due to the variables associated with different control equipment to be installed and the installation environment of each site.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Introduction

Figure 1:
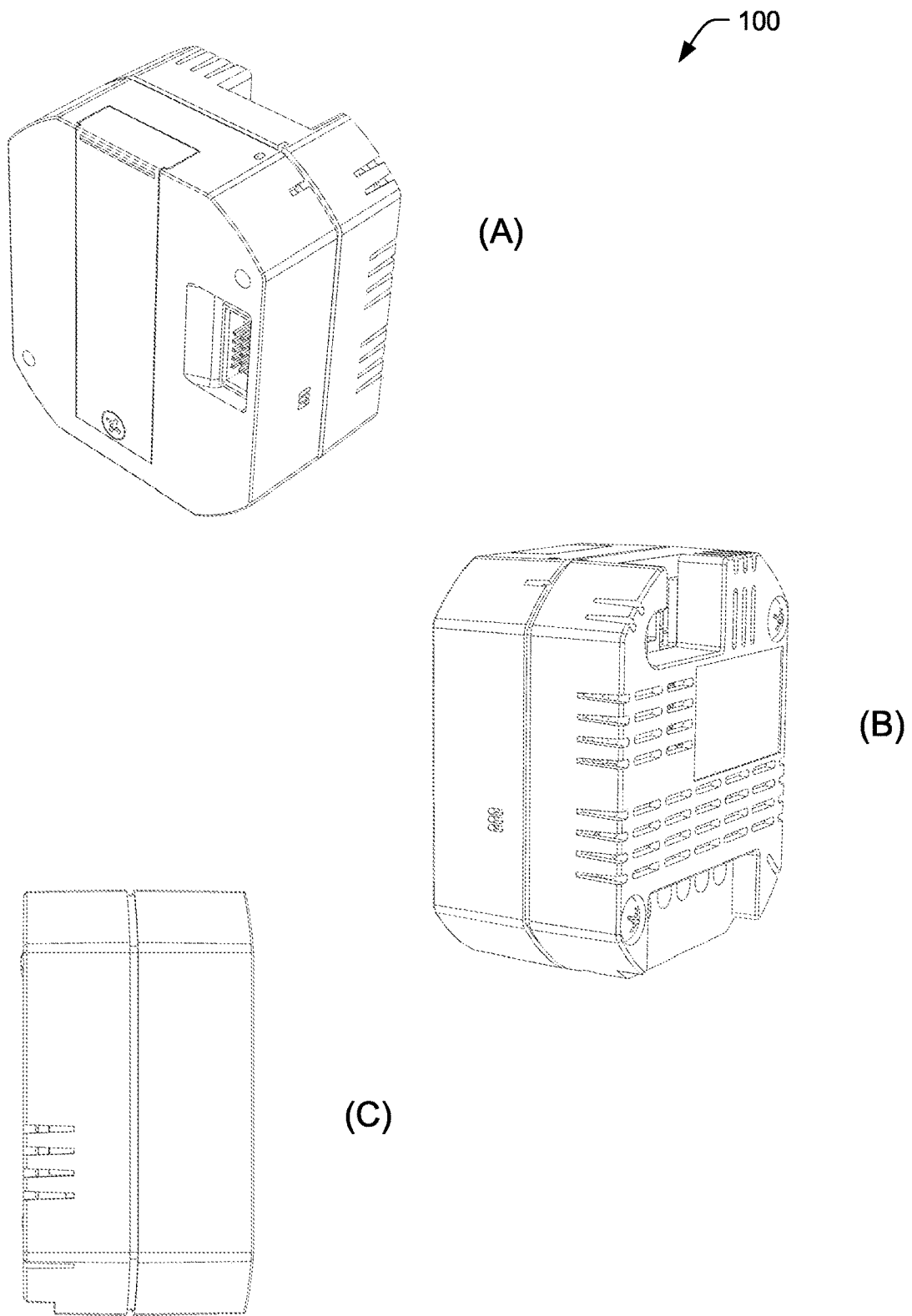
FIG. 1 includes perspective views of the front (A) and back (B), and a side (C) view of an example load control module, according to an embodiment.

An example load control module (LCM) 100, such as a variable lamp or appliance control and/or switch, is described, according to various embodiments. In the embodiments, the LCM 100 includes one or more provisions for a user to switch and/or adjust the power to one or more fixed or variable loads (such as to switch and/or dim the intensity of one or more lamps, for example). In the implementations, the load to be controlled may be local, i.e., connected to the LCM 100 or remote to the LCM 100.

In one embodiment, the LCM 100 is capable of being used to function both as a stand-alone unit, i.e., the user manipulates the LCM 100 via a remote/non-coupled user interface, or in conjunction with an automation system or other remote control which is also capable of remotely and/or automatically controlling or adjusting the intensity of the one or more local and/or remote appliances. For example, the LCM 100 may be a component of a home automation system, or the like.

In one example, the load control device may be mounted in a hidden location and receive commands from a remote control source, by wired or wireless communication with the remote control source. In one embodiment, the LCM 100 may be mounted in a load control center or similar electrical cabinet. For example, the LCM 100 may be mounted on a DIN rail or like structure within the cabinet. Accordingly, the LCM 100 need not be mounted proximate to the load(s) controlled by the LCM 100.

In another implementation, the LCM 100 may be mounted within (or as part of) an appliance, and installed as a part of the power supply components of the appliance, for instance. In a further implementation, an embodiment of the LCM 100 may be mounted inline (in series with) a power cord/power lead of the appliance. For example, the LCM 100 may be installed by cutting the power cord (near the appliance, for example) and coupling the LCM 100 to the cut ends of the power cord. In such an embodiment, the LCM 100 may be used to control the appliance both locally at the appliance, with a user interface connected, and also via remote and/or automated control via the same LCM 100. In an embodiment, the LCM 100 may be used to control connected loads (such as power on or off, dimming, etc.) as directed by an interface or controller (such as the user interface module 800 discussed below, for example).

In various implementations, the LCM 100 may be retro-fit to an existing appliance or electrical installation, or coupled to a new appliance when manufactured. In an embodiment, the LCM 100 includes one or more interchangeable adapters arranged to couple the LCM 100 to any of various types of power leads. For example, the appropriate adapter may be selected based on the type or design of the power lead. In the example, the selected adapter(s) may be coupled to the LCM 100 via a socket, for instance, that is configured to receive any of the interchangeable adapters.

In an implementation, the adapters are arranged to position or align a power lead inserted into the adapter such that the power lead makes a secure electrical and physical connection to the LCM 100. In one example, the power lead is coupled to electrical terminal pins based on selecting the adapter associated with the type or design of power lead, and inserting the power lead into a cavity of the adapter. In another example, one or more plungers or screws, fasteners, etc. physically secure the power lead to the adapter (or to the enclosure) through a compression of the plunger(s) or tightening of the fasteners onto the power lead.

An example user interface module (UIM) 800, such as a touch pad or the like, is also disclosed, according to various embodiments. In the embodiments, the UIM 800 may be used to instruct one or more load control devices (such as the LCM 100, for example) to perform certain functions. In such embodiments, the UIM 800 acts as a remote control for the load control devices, communicating by wired or wireless communication to the load control devices. In some implementations, the UIM 800 may be arranged to switch and/or control the intensity of multiple variable or non-variable loads, including a local, i.e., connected, appliance and one or more remote appliances.

In one implementation, the UIM 800 is employed to send control commands to a local or remote load control device (such as the LCM 100, for example) for switching and/or dimming one or more loads coupled to the local or remote load control device. For example, the commands may be sent from the UIM 800 to the load control device via wired or wireless communication. In alternate implementations, the UIM 800 may be physically coupled to the load control device (such as the LCM 100, for example) or may be remote from the load control device.

In some embodiments, the UIM 800 may be wall-mounted or otherwise mounted in a convenient and exposed location for user operation (for instance near to the appliance to be controlled or within the same room as the appliance) while the load control device may be mounted more or less remote from the UIM 800, such as within a wall, an enclosure, a mechanical or electrical access room and/or cabinet, or the like. In the embodiments, the UIM 800 and the load control device (such as the LCM 100, for example) may be installed either as individual modules or as a connected assembly, as the installer may find convenient. In various implementations, the two or more intercommunicating modules (e.g., the UIM 800 and the LCM 100) communicate via one or more of various wired datalink technologies (e.g., including low-voltage data transmission, data networking such as Ethernet, etc., RS232, RS485, ModBus, programmable logic control, and the like) and/or wireless technologies (such as ZigBee, BLUETOOTH™, WIFI™, wireless networks such as WLAN, etc., and so forth).

In an embodiment, the UIM 800 includes user-operable controls for selecting the desired operation of the controlled appliance(s) and the load control device (such as the LCM 100, for example) includes the electrical and/or mechanical components for switching the power to the controlled appliance(s) and for varying the intensity of the supply for variable operation of the appliance(s). In another example, the UIM 800 may include user-operable controls for initiating a signal (e.g., data or communication signal, etc.) and the load control device may include the electrical and/or mechanical components for receiving instructions and/or data from the UIM 800 and for generating and/or sending the signal desired.

In various implementations, the UIM 800 may include a capacitive touch interface instead of or in addition to mechanical sliders or mechanical buttons. For example, in a mechanical button arrangement the user may press and hold an up or down button to change load intensity, while in a capacitive touch arrangement the user can also directly touch the intensity level desired and/or slide the finger to the infinitely variable desired intensity, as well as use an up and down button (capacitive or mechanical) arrangement.

Various implementations and arrangements are discussed with reference to electrical and electronics components and varied carriers. While specific components (i.e., integrated circuits, electrical components, etc.) are mentioned and illustrated, this is not intended to be limiting, and is for ease of discussion and illustrative convenience. The techniques and devices discussed are applicable to load control devices having any type or number of electrical components, circuits (e.g., integrated circuits, analog circuits, digital circuits, mixed circuits, ASICS, memory devices, processors, etc.), groups of components, packaged components, structures, and the like. Additionally, the techniques and devices discussed with reference to printed circuit boards (PCBs) are applicable to other types of carriers (e.g., board, chip, wafer, substrate, package, container, can, module, etc.) that components or circuits may be mounted fully or partially on or within.

Implementations are explained in more detail below using a plurality of examples. Although various implementations and examples are discussed here and below, further implementations and examples may be possible by combining the features and elements of individual implementations and examples.

The following description refers to the drawings shown in FIGS. 1-13. Several embodiments of LCM 100 and UIM 800 are described. Descriptions of the embodiments (including illustrations, notes, etc. in the drawings) may include examples of designs, materials, types of fabrication, and dimensions. However, the descriptions and illustrations are for ease of understanding and are not intended to be limiting. Other suitable designs, materials, types of fabrication, and dimensions may be used to construct an LCM 100 or a UIM 800 without departing from the scope of this disclosure.

Example Load Control Module

FIG. 1 includes perspective views of the front (A) and back (B), and a side (C) view of an example load control module (LCM) 100, according to an embodiment. The explanations and illustrations herein discuss a lamp switch and/or dimmer as an example. As mentioned above, the use of the term "LCM 100" includes controllers, switches, and the like, that are arranged to adjust an intensity of a variable load, including switching the load fully on or off.

The techniques, components, and devices described herein with respect to the LCM 100 are not limited to the illustrations in the figures, and may be applied to other designs, types, arrangements, and constructions including other electrical components without departing from the scope of the disclosure. In some cases, alternative components may be used to implement the techniques described herein. In various implementations, the LCM 100 may be a stand-alone unit, or it may be a portion of a system, component, structure, or the like.

Figure 2:
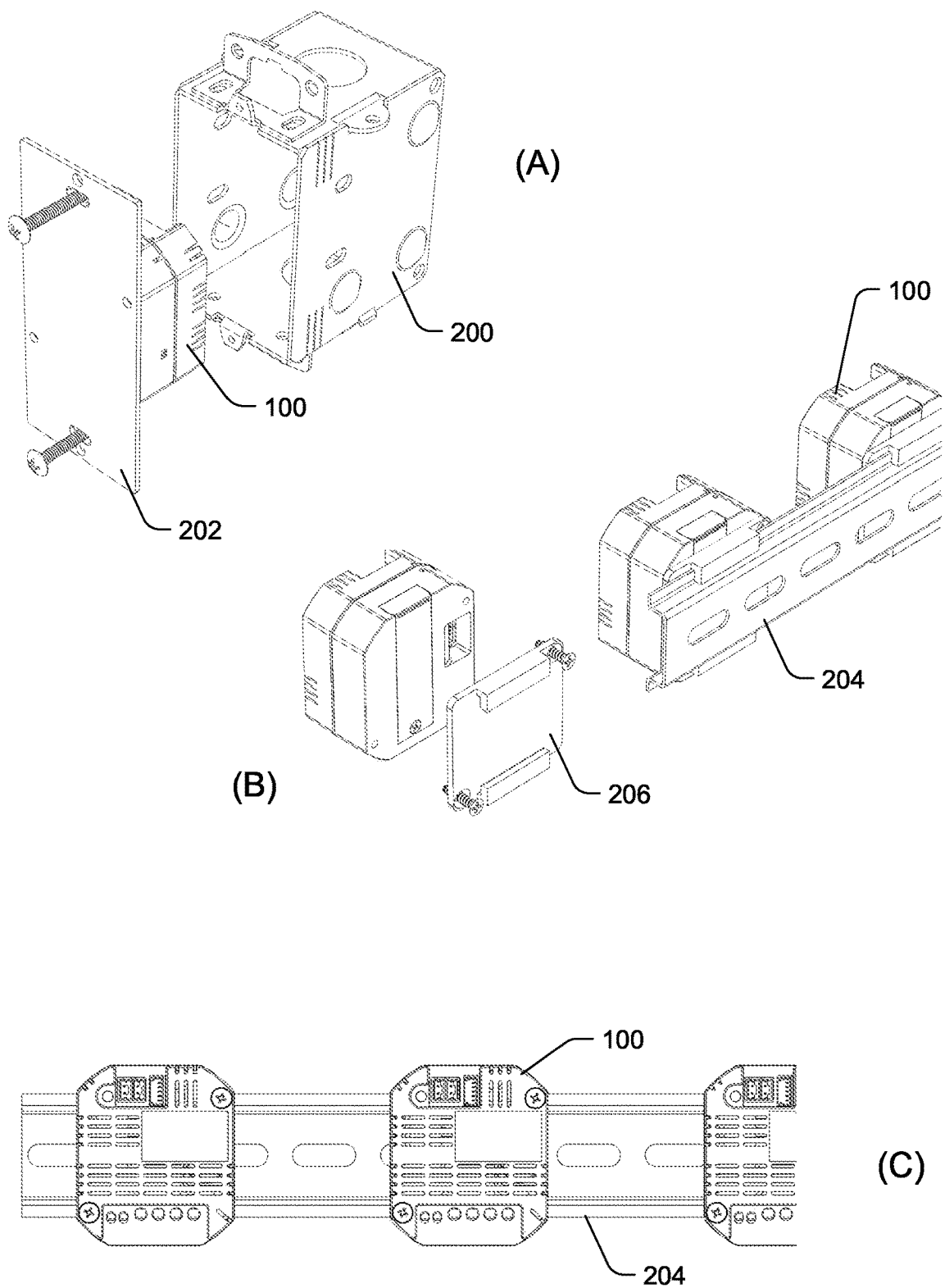
FIG. 2 includes several views of example mounting techniques for the load control module of FIG. 1, according to various embodiments.

FIG. 2 includes several views of example mounting techniques for the LCM 100, according to various embodiments, and as discussed above. For example, the LCM 100 can be mounted in a single gang electrical box 200, for installation within a wall or similar space, including using a mounting plate or yoke plate 202, if desired. In an implementation, the dimensions of the LCM 100 enclosure 602 (see FIG. 6) are globally universal, such that the same enclosure 602 fits inside single gang boxes used in the USA, Germany, the United Kingdom, and other parts of the globe.

In other implementations, the LCM 100 may be mounted on a DIN rail 204, as shown in FIG. 2, using DIN rail adapters 206 for example. Multiple LCM 100 units may be mounted on a single DIN rail for convenience. In some cases, the DIN rails may be located in electrical rooms, electrical panels, enclosures, and the like. In alternate embodiments, the LCM 100 may be mounted in these and other locations by using various adapters, yoke plates, and so forth, which may be attached to the enclosure of the LCM 100.

Figure 3:
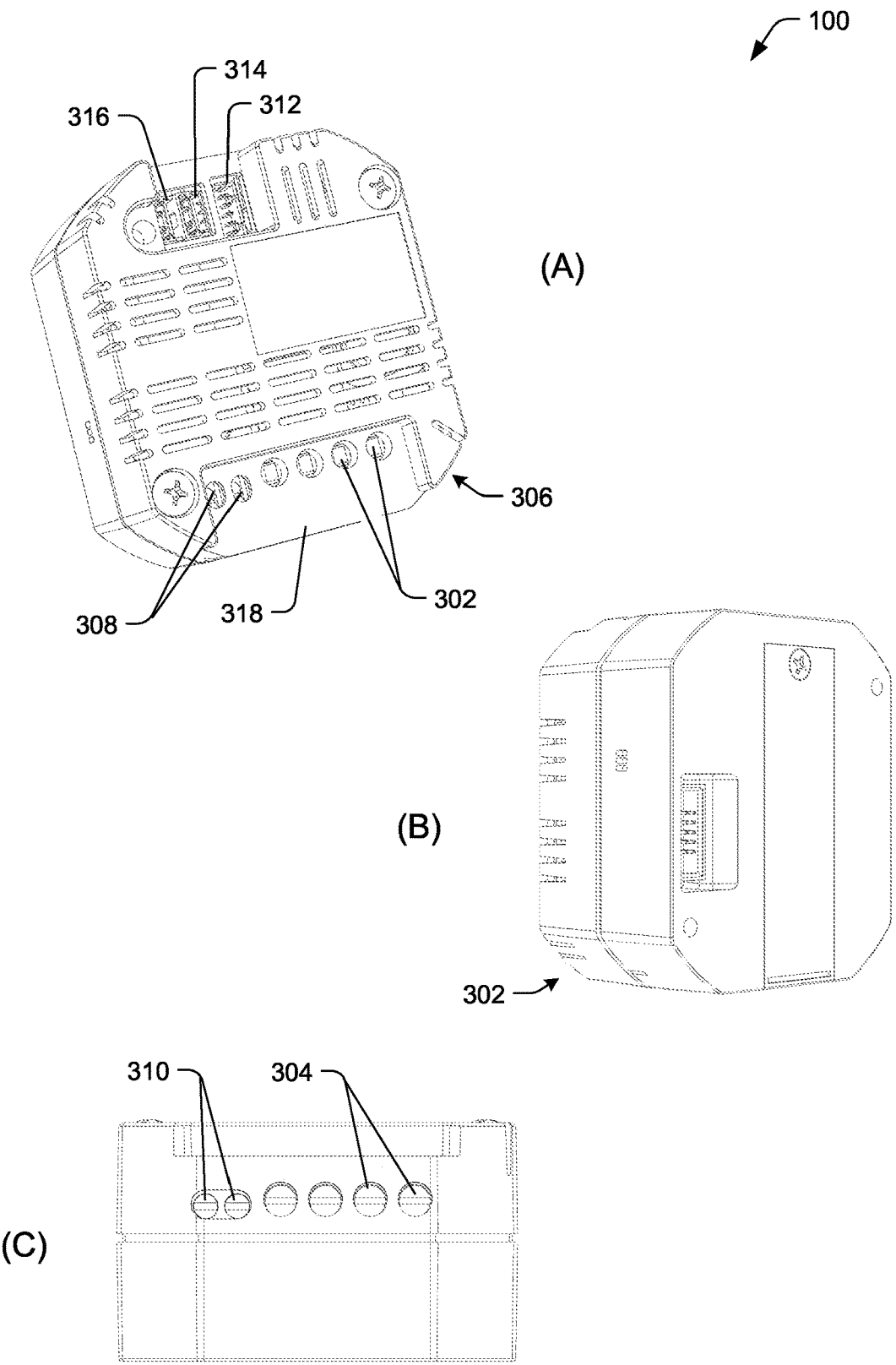
FIG. 3 includes front, back, and bottom views of the example load control module of FIG. 1, showing example power connection points, according to an embodiment.

FIG. 3 includes back, front, and bottom views of an example LCM 100, showing example power connection points, according to various embodiments. In an implementation, as shown in FIG. 3, the LCM 100 includes one or more power cord openings 302 arranged to receive the power cord of the line power and the power cord of an appliance to be controlled. For instance, in some embodiments, the power leads to the controlled appliance may be inserted into the openings 302, and tightened into place using fasteners 304, plungers 306, or the like. In one example, the power leads of the controlled appliance are cut, and the LCM 100 is placed inline of the power leads by inserting the cut ends of the power leads into the openings 302 in the LCM 100. In various implementations, the power connection points 302 may be located at different places/sides of the LCM 100 for convenience.

In an implementation, the LCM 100 includes adapters 318, which include the power cord receptacles 302 and are arranged to couple the LCM 100 in series with the power lead of the connected appliance. In various implementations, different designs of interchangeable adapters 318 may be provided to accommodate different types of power leads, where each of the different adapters 318 interfaces with a power control board of the LCM 100 in a like manner. In the implementations, multiple adapters 318 are available, and the interchangeable adapters 318 are selected according to a design or type of the power lead, such that the power lead is correctly positioned within the LCM 100. In the implementations, the openings 302 are "cord guides" arranged to interface with predetermined designs of power leads. In other words, the openings 302 can be shaped differently with different types of adapters 318, to guide and align the different types of power leads (e.g., having different sizes and shapes) into the correct position for engaging with the power control board of the LCM 100.

In various embodiments, as shown in FIG. 3, the LCM 100 may include one or more compression fittings (304, 306, 310) to secure the power lead to the LCM 100. In various implementations, the compression fittings may include one or more recessed portions and one or more associated fasteners 304, 310 or plungers 306. For example, the compression fittings may be operated by fully inserting the power lead into the receptacle 302 (e.g. of the adapter 318, in one example) and tightening the fasteners (304, 310) or pressing the plungers 306 onto the power lead. In an implementation, the plungers 306 are not activated using a special tool, and may be pressed using a common tool, such as a screwdriver, needle-nose pliers, or an adjustable pliers, for example. In another implementation, the plungers 306 lock into a compressed position using tabs, notches, barbs, or the like, when pressed to a predetermined depth.

In embodiments having one or more compression fittings, the power lead may not be stripped prior to insertion of the power lead into the adapter 318, for example. In alternate implementations, the openings 302 or adapters 318 may be arranged to accept power leads having three or more conductors (e.g., for hot, neutral, and ground, for example).

Also shown in FIG. 3 are example control input terminals 308 (for low voltage (e.g., 0-5V, 0-10V, etc.) control leads, for example) and fasteners 310 (shown in the top view). Additionally, an example wired communication port 312 (e.g., for RS485) and an example external relay control port 314 are illustrated. For instance, a wired communication port 312 or a relay control port 314 may be used for receiving (or sending) commands via remote control by wire, for controlling the connected load or another load. For instance, in an embodiment the LCM 100 can directly control a connected load as discussed, and can also switch another load on and off via the relay port 314. In the example, a plug-in relay component (not shown) can be plugged into the relay control port 314, allowing a communications portion of the LCM 100 to relay a switching signal to a remote appliance. In various embodiments, a LCM 100 may include additional, fewer, or alternate data and/or control ports or openings. Additionally a grounding terminal 316 may also be present, for coupling the LCM 100 to a grounding connection.

Figure 4:
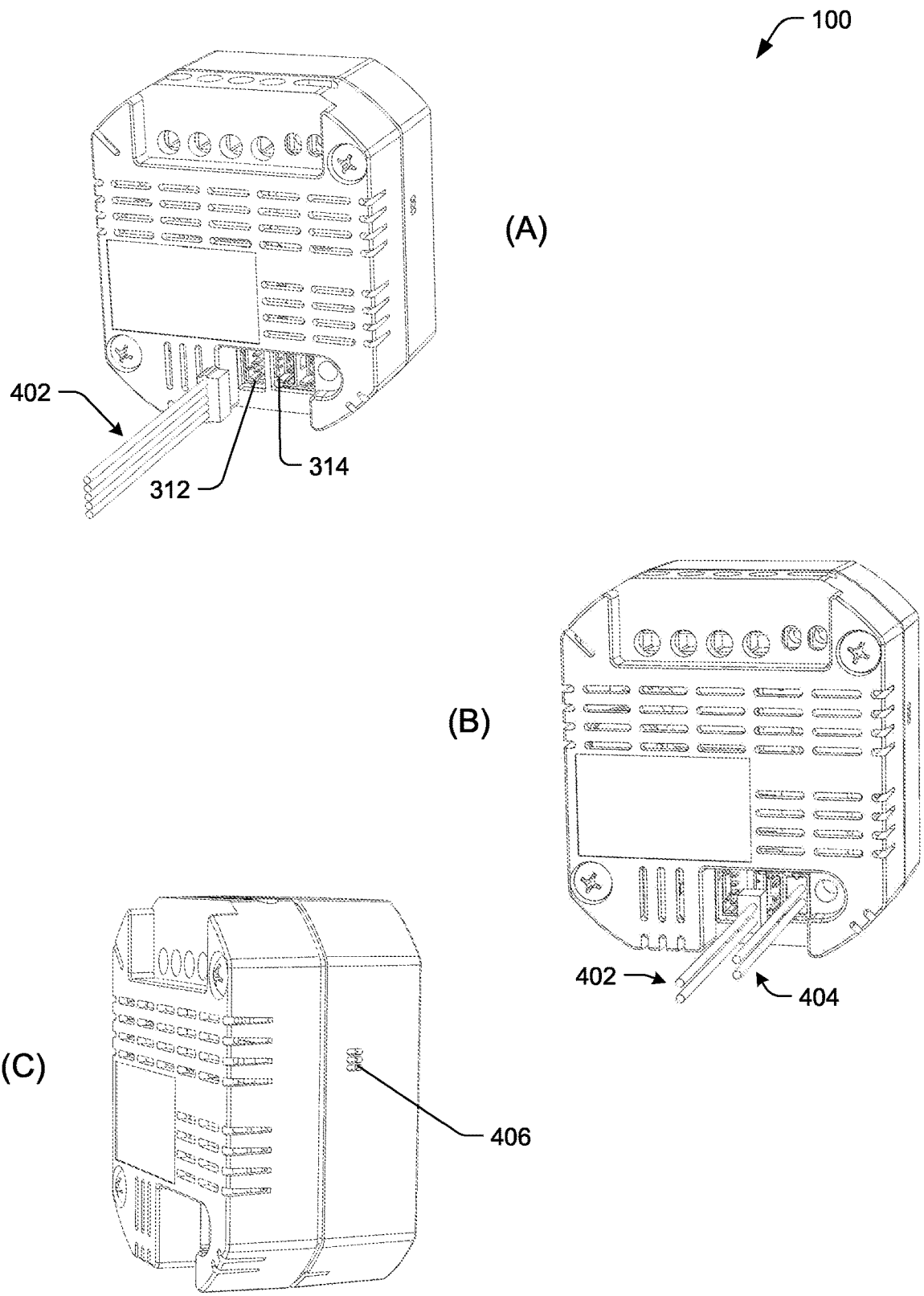
FIG. 4 includes back and side views of the example load control module of FIG. 1, showing example data connection points, according to an embodiment.

In an implementation, as shown in FIG. 4, one or more wire harnesses 402 and 404 may be used with the communication port 312 and/or the relay control port 314 respectively. For example, the wire harnesses 402 and 404 may be used to transmit commands to the LCM 100 by wired communication or by data signals. Further, other types of data ports (such as port 406) may be included for data transmission, communication with the LCM 100, for programming the LCM, or the like. For example, the data ports may include USB®, Firewire®, RS232, RJ45, and so forth. In such examples, data and/or control signals may be exchanged between the LCM 100 and a remote device (such as a personal computer, home automation terminal, etc.)

Figure 5:
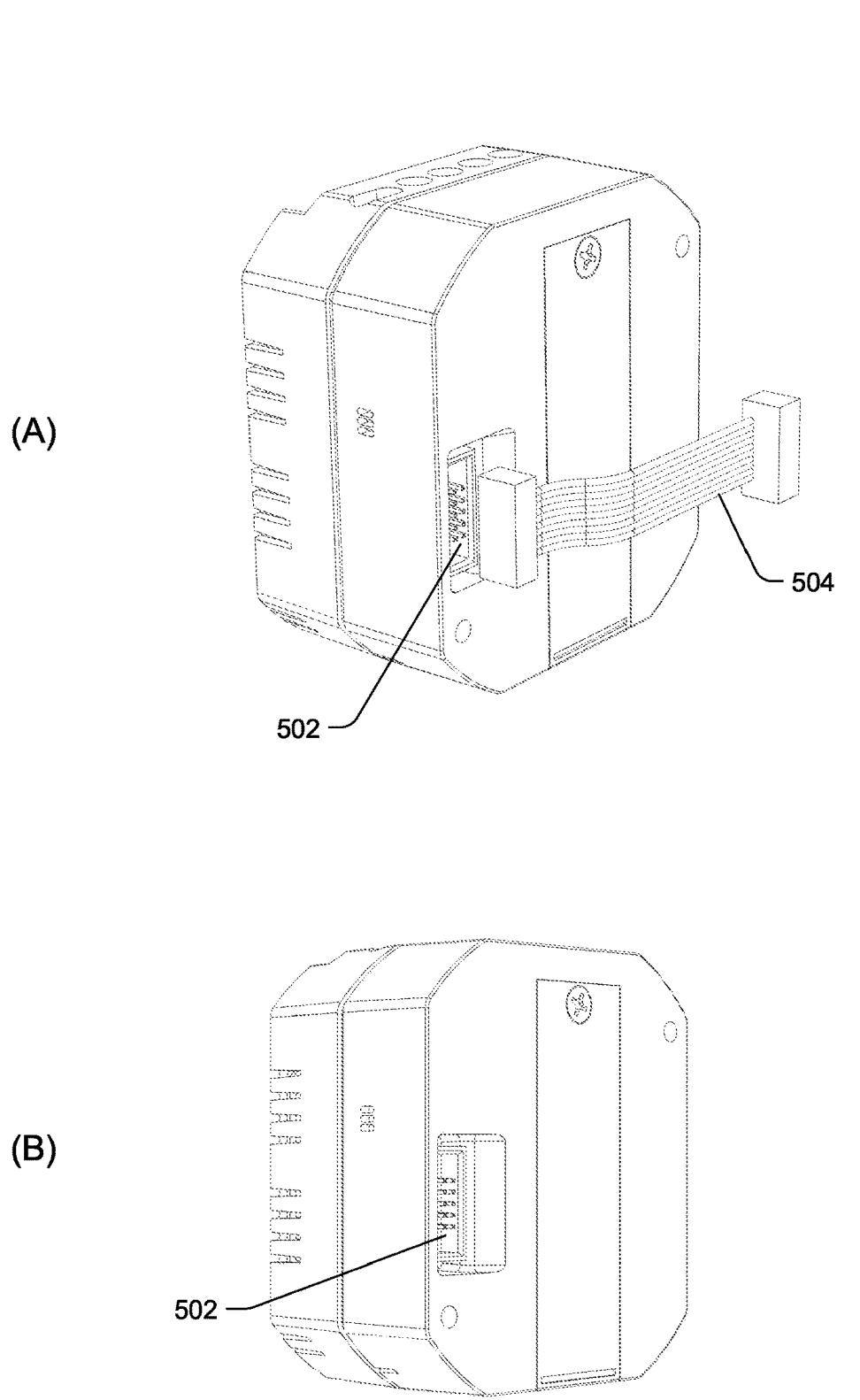
FIG. 5 includes front views of the example load control module of FIG. 1, showing example interface connections, according to an embodiment.

FIG. 5 includes front views of an example LCM 100, showing example interface connections 502, according to an embodiment. For example, the LCM 100 may communicate with a remote control device (such as the UIM 800, for example) by wire via the interface connections 502. In some embodiments, the interface connection 502 may provide the communication using a wire harness, such as wire harness 504, for example. In other embodiments, the remote control device may "plug into" the interface connections 502, while physically coupling the remote control device to the LCM 100, to provide the wired control.

Figure 6:
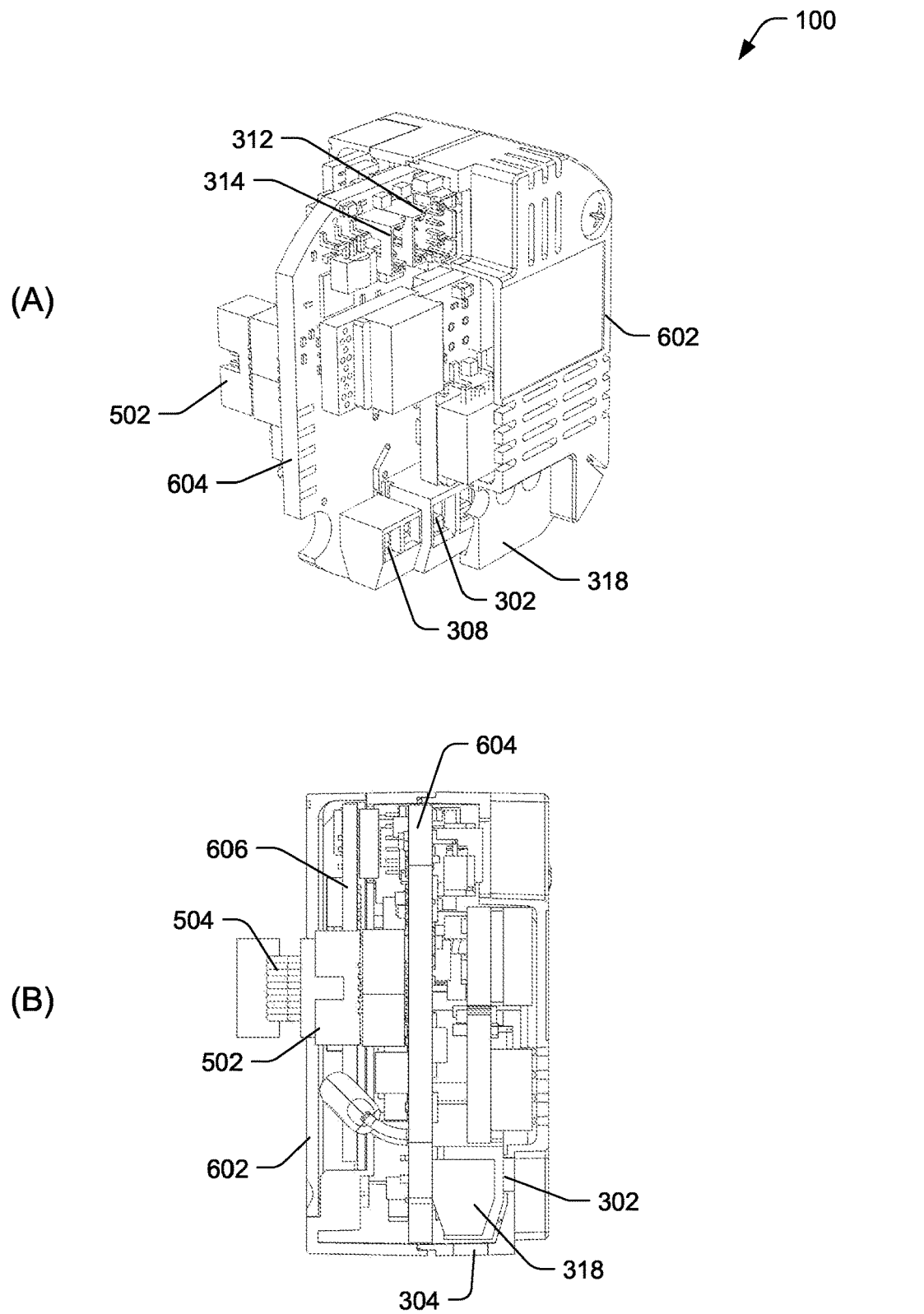
FIG. 6 includes two cross-sectional views of the example load control module of FIG. 1, showing example internal components, according to an embodiment.

FIG. 6 includes two cross-sectional views of an example LCM 100, showing example internal components, according to an embodiment. In an implementation, the LCM 100 includes an enclosure 602 arranged to house the internal components and to mount the LCM 100 using various techniques discussed above. In various embodiments, the enclosures 602 may have a variety of form factors, shapes, dimensions, designs, and the like. For instance, in some implementations, the enclosure 602 is designed to fit inside of a common single gang electrical box (e.g., from US, UK, Germany, or other countries), or to be mounted to a DIN rail, as described above. Also, in some implementations, multiple LCM 100 can fit within a common multi-gang box (e.g., from US, UK, Germany, or other countries), or be mounted to a DIN rail, as described above.

In an implementation, as shown in FIG. 6, the LCM 100 includes a variable intensity (VI) portion (VI board 604, for example), and a communications (e.g., radio) portion (board 606, for example). In other implementations, the LCM 100 may include additional boards or alternative boards, depending on the functionality desired.

In one embodiment, the adapters 318 are coupled to the VI board 604 and electrically as well as physically couple the power leads of the controlled appliance to the VI board 604 (and thus, the LCM 100). In the embodiment, the VI board 604 is arranged to provide control of power output to the connected load (e.g., controlled appliance), based on received control information, in response to user input or input from an automation system or the like (via a control device, for instance). For example, the power output to the load may be varied by the VI board 604, resulting in a desired intensity of operation of the load. Further, the power to the controlled load may be switched on and off via the VI board 604. In various embodiments, the functions and components of the VI board 604 may be incorporated on a single circuit board or on multiple interconnected circuit boards.

In one implementation, the VI board 604 is arranged to adjust (e.g., attenuate or increase, etc.) the power output on the power lead connected to the LCM 100 and inserted into the adapters 318, based on the input received by the LCM 100. For example, the VI board 604 may decrease or increase the voltage, the amperage, the power curve (e.g., by Pulse Width Modulation, or the like), etc. to the appliance attached to the power lead, based on the input received.

In another implementation, the VI board 604 is arranged to provide (e.g., generate, etc.) one or more control signals based on the user input to the LCM 100. In various embodiments, the control signal(s) have varied characteristics or properties to represent a desired intensity of operation (including fully on and off) of the controlled appliance(s). In other words, the VI board 604 is arranged to generate a control signal having a characteristic (e.g., magnitude, polarity, frequency, etc.) that is associated with the desired intensity of a controlled appliance.

In one example, a magnitude of the control signal is associated with the desired intensity and a higher magnitude represents a greater intensity. In an alternate example, a higher magnitude represents a lesser intensity. In a further example, a frequency of the control signal is associated with the desired intensity and a higher frequency represents a greater intensity, and so forth.

Figure 7:
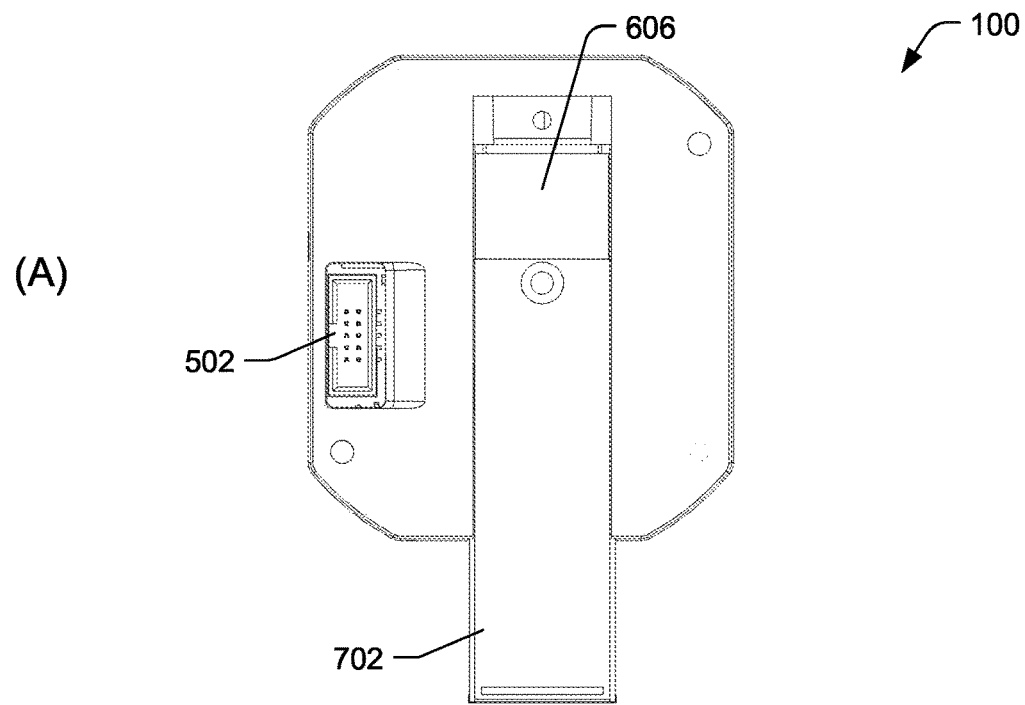
FIG. 7 includes front views of the example load control module of FIG. 1, showing an example communication board, according to an embodiment.
Figure 7:
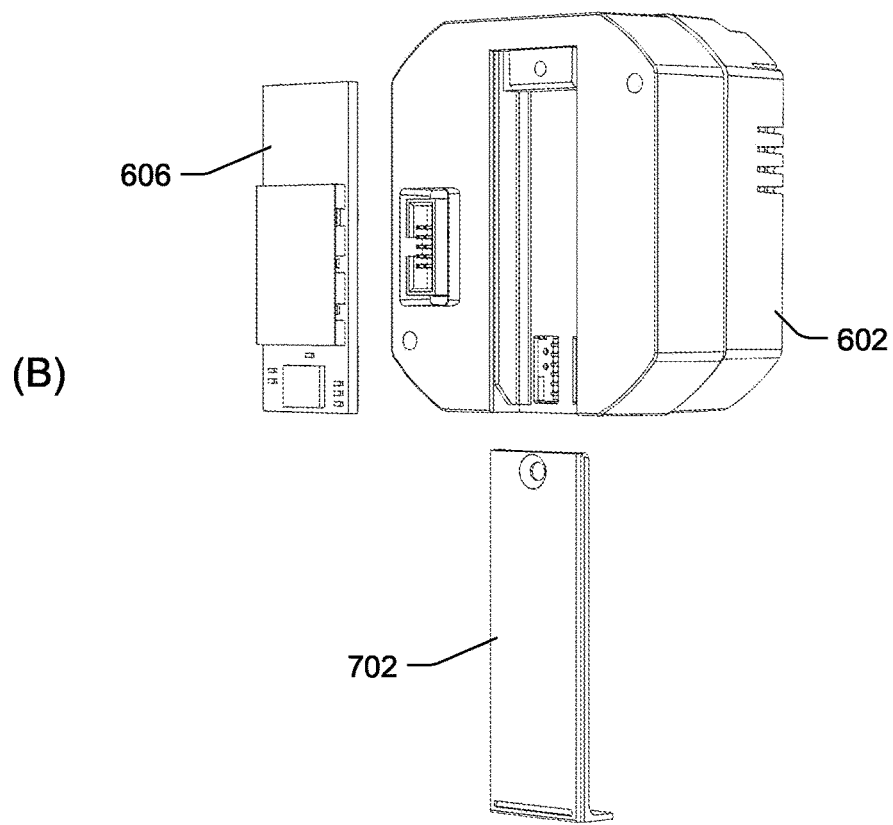

In an implementation, as shown in FIGS. 6 and 7, the radio board 606 is arranged to transmit the one or more control signal values generated by the LCM 100 to a remote control or automation system and/or to one or more remotely controlled appliances. In various implementations, the radio board 606 includes various electronic components for wireless communication according to one or more technologies or protocols.

In an implementation the radio board 606 (i.e., communications portion) is arranged to receive wireless control instructions from a remote control or automation system that defines the desired power output to the connected appliance. In the implementation, the radio board 606 can transmit those instructions to the VI board 604, so that the VI board 604 changes the output power to the desired level. The radio board 606 may also transmit the control information to the one or more remotely controlled appliances. Additionally, the radio board 606 may communicate the corresponding values to a display or user interface for synchronization. Further, the radio board 606 can transmit status information back to the remote control or automation system, based on a status of the connected load or the one or more remotely controlled appliances. In other implementations, one or more of these control features can be performed via wired communication using RS485 or other data transmission types, low-voltage signal (0-5V, 0-10V, etc.), or the like, using wired interconnections (such as the wire harness 504, or the like). For example, in one embodiment, the LCM 100 receives control communications from at least one user interface module (such as UIM 800, for example), coupled by a wire harness to the LCM 100.

In some implementations, the radio board 606 may be accessed via a door 702 in the enclosure 602 for convenience.

Example User Interface Module

Figure 8:
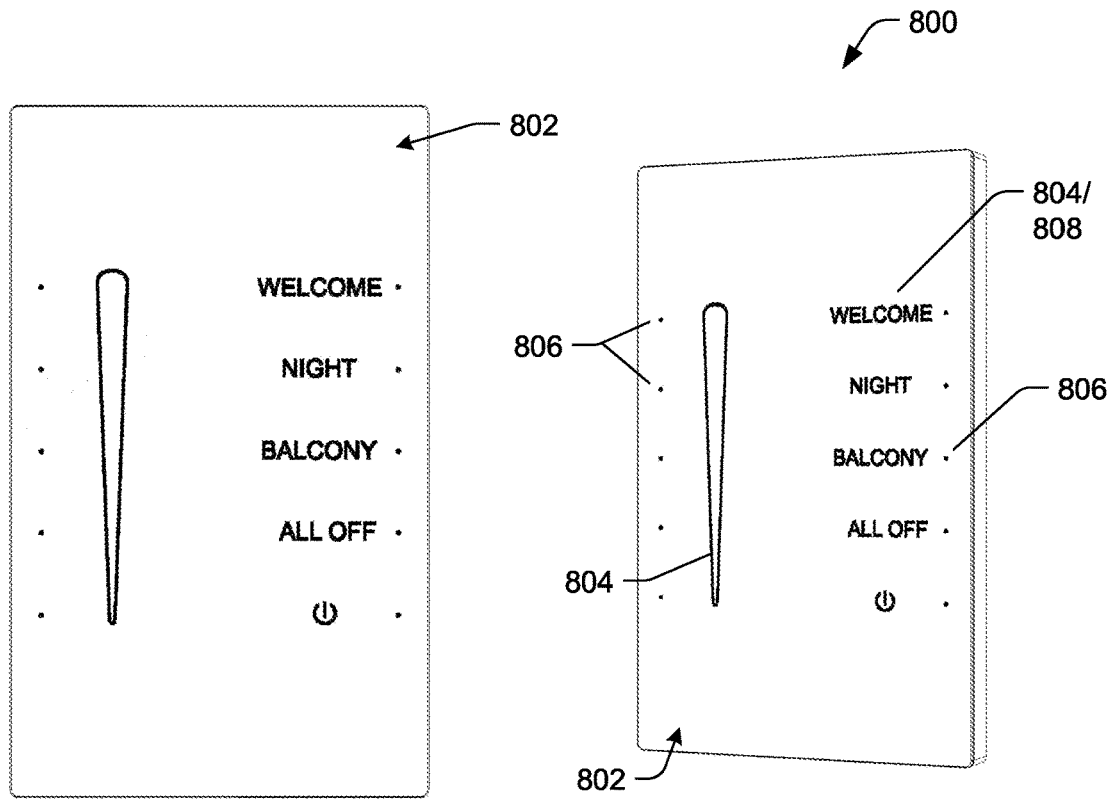
FIG. 8 includes several front views of an example user interface module, according to an embodiment.
Figure 8:
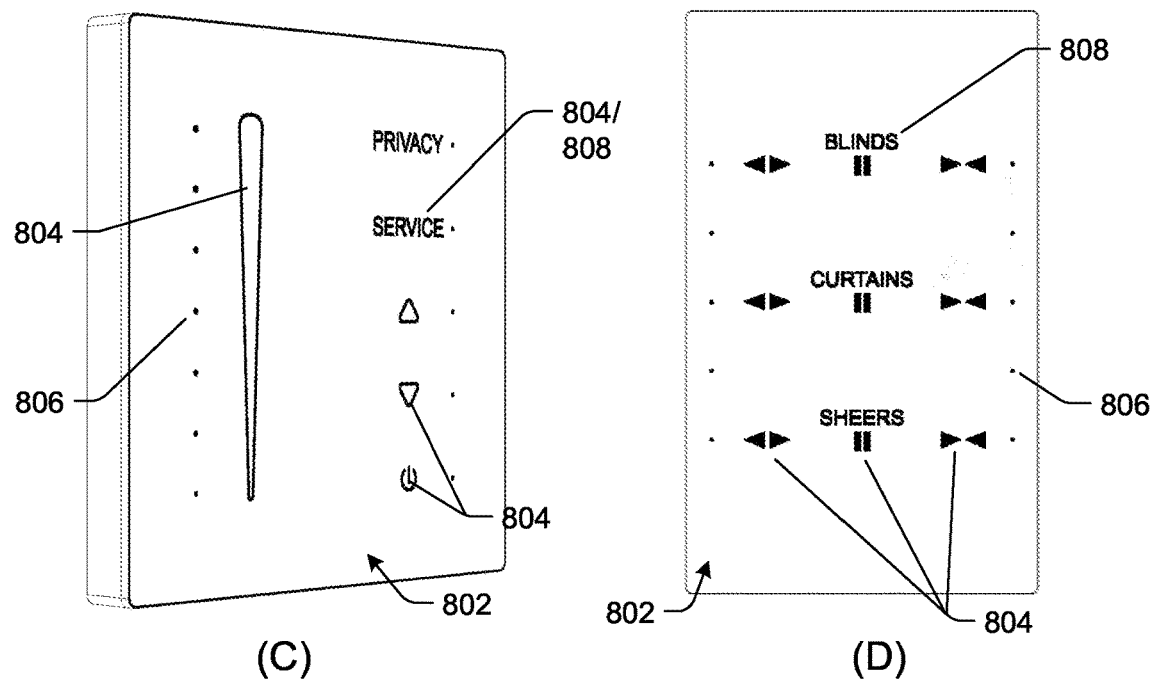

FIG. 8 includes several front views of an example user interface module (UIM) 800, according to various embodiments. In the embodiments, the UIM 800 may be used to instruct one or more load control devices (such as the LCM 100, for example) to perform certain functions. In such embodiments, the UIM 800 acts as a remote control for the load control devices, communicating by wired or wireless to the load control devices. In some implementations, the UIM 800 may be arranged to switch and/or control the intensity of multiple variable or non-variable loads, including a local, i.e., connected, appliance and one or more remote appliances.

As shown in FIG. 8, an example UIM 800 includes a configurable user interface (UI) 802, which receives user input and initiates one or more control signals based on the user input. For example, the user may select one or more appliances (e.g., lamps, curtains, fireplace, privacy indicator, etc.) to be turned on, turned off, adjusted in intensity, or the like, via the UI 802. As shown in FIG. 8, in various embodiments, the UI 802 may include a capacitive touch panel and/or other types of buttons, switches, sliders, actuators (e.g., 804), and so forth. Additionally, the UI 802 may include one or more indicators 806 and/or legends 808 arranged to display a status of the controlled appliance(s), a dimming level, or other information. In an embodiment, the UI 802 may be backlit for ease of use in low-light or no-light conditions.

Figure 9:
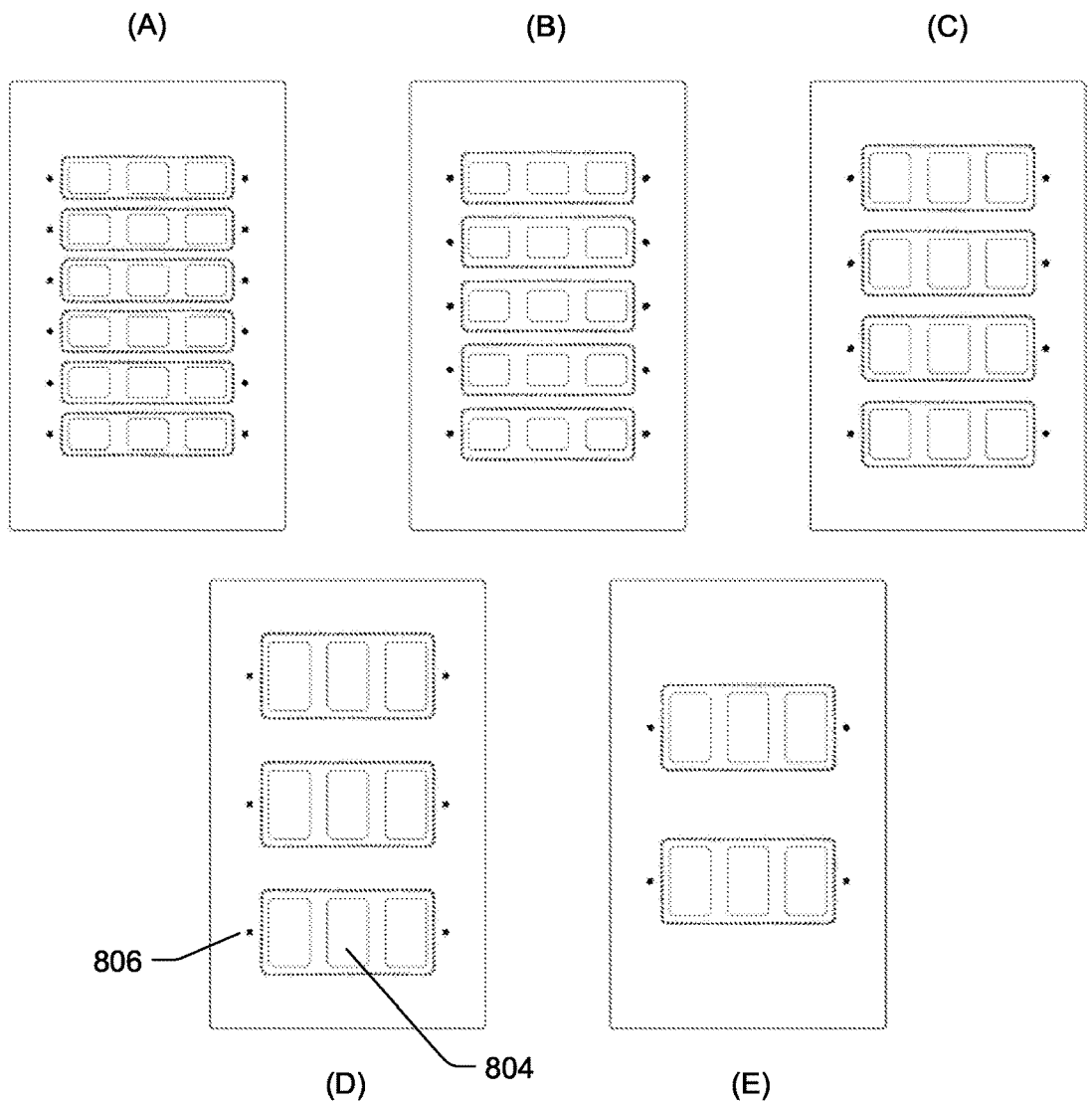
FIG. 9 includes several example user interface configurations, according to various embodiments.
Figure 10:
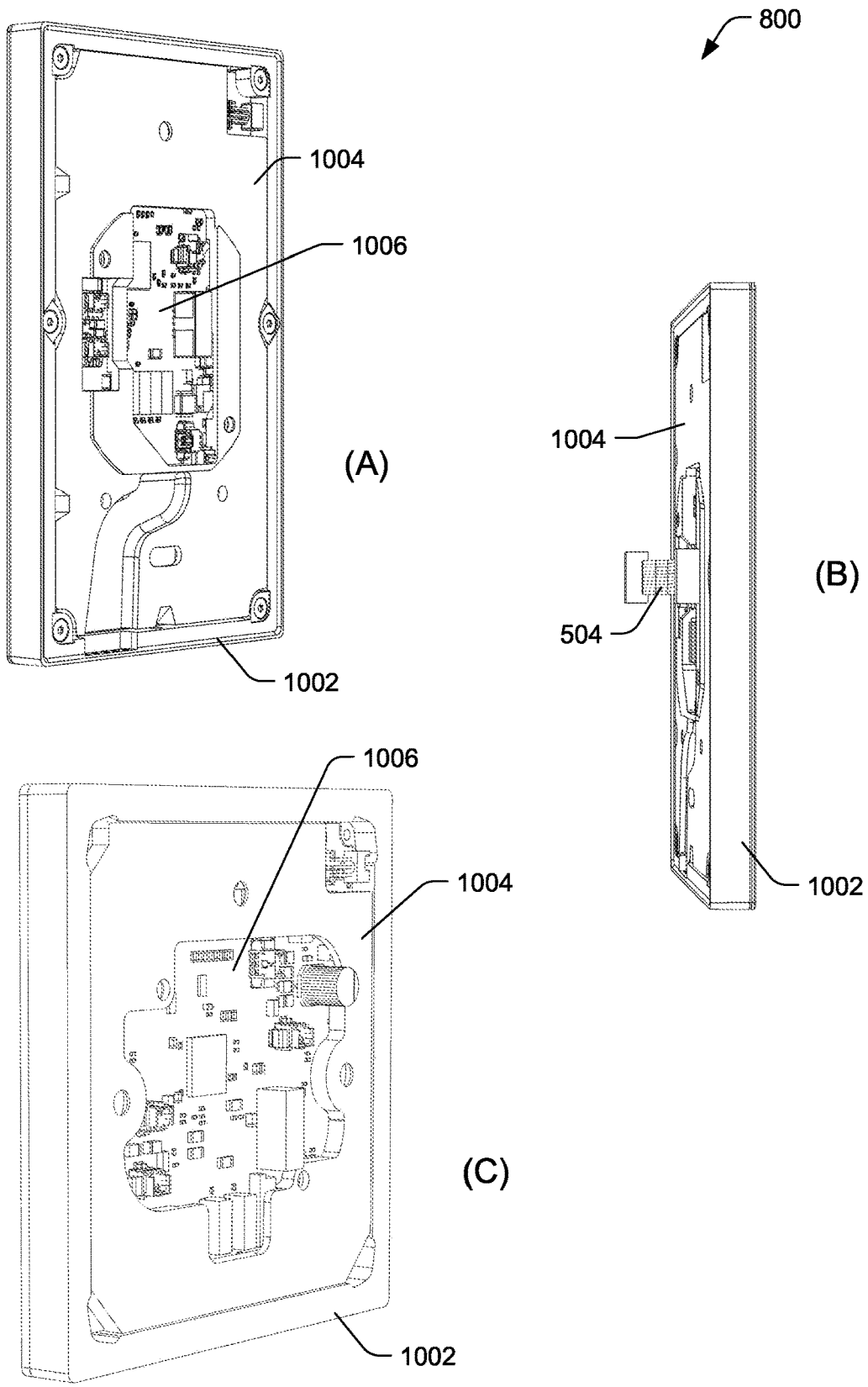
FIG. 10 includes several back views of the example user interface module of FIG. 8, according to an embodiment.
Figure 11:
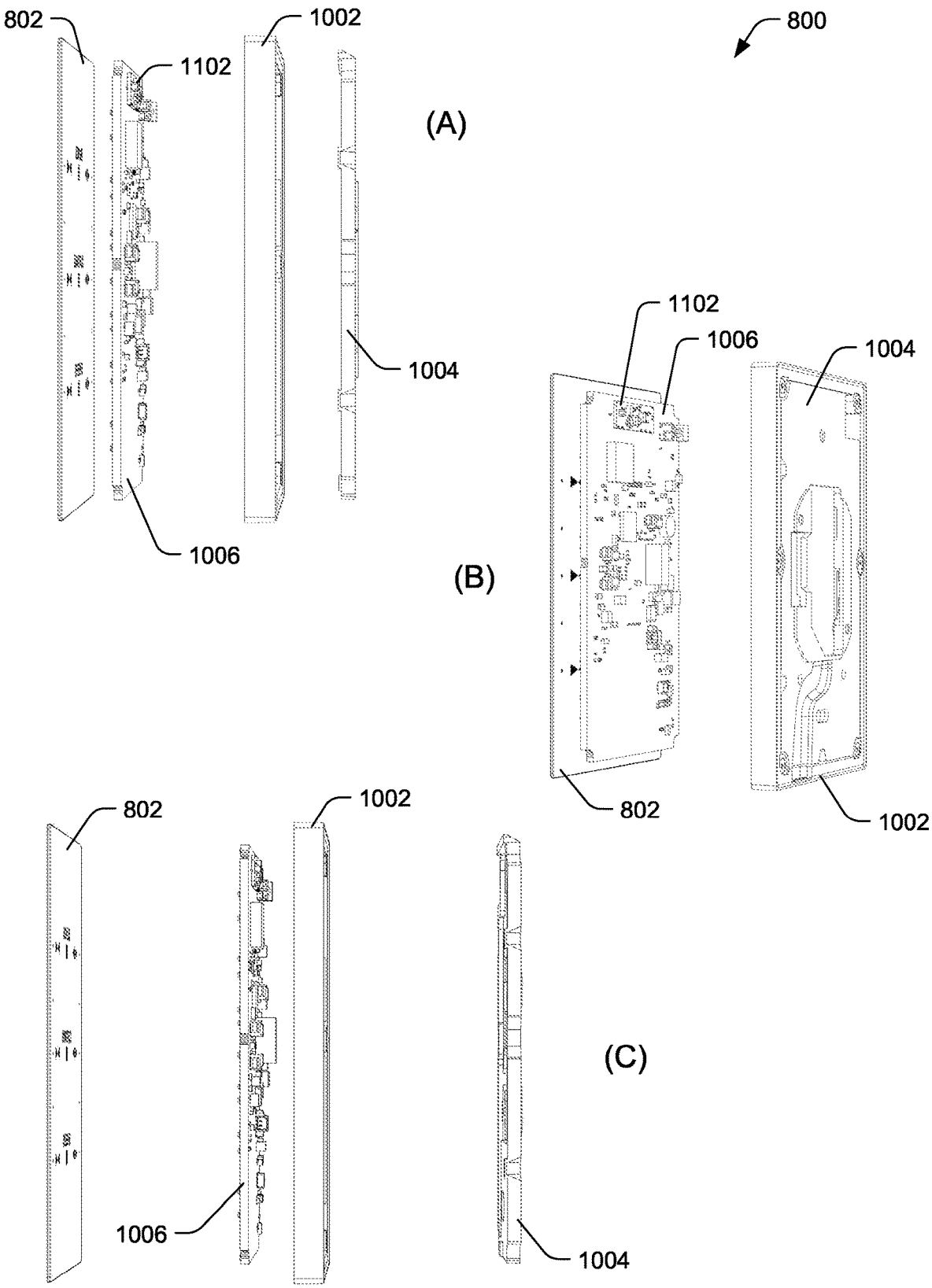
FIG. 11 includes several exploded views of the example user interface module of FIG. 8, according to an embodiment.

In an implementation, the UI 802 may be customized for a preselected or desired configuration or layout, providing a user with multiple interface options with the same hardware. For example, the UI 802 may be customized to include actuators 804, indicators 806, and the like for various applications and/or feature levels. In such implementations, the UIM 800 includes various electrical and/or mechanical components (e.g., controls, actuators, switches, etc., integral to the UI 802 or mounted to a UI board 1006, for example) to allow the UI 802 to be customized in form and appearance and be operative as desired based on the customizations, without changing hardware. In the implementations (as shown in FIGS. 10 and 11), the controls, actuators, switches, etc. can be integral to the UI 802 and/or the UI 802 can be disposed over the various electrical and/or mechanical components of the UI board 1006. In an embodiment, the electrical and/or mechanical components are activated when a user actuates a portion of the UI 802. For example, as shown in FIG. 9, the UIM 800 may include multiple touch-sensitive (e.g., capacitive, etc.) and/or mechanical controls, actuators, switches, etc. (e.g., 804) as well as multiple indicators 806, display components, and the like, in various quantities and layouts. When the UI 802 is customized, some of the multiple controls, actuators, switches, etc. (e.g., 804) and the multiple indicators 806, display components, and the like are activated for use, while others are dormant, based on the custom UI 802 layout desired. In alternate embodiments, the UI 802 may include one actuator, control, switch, indicator, or the like (e.g., 804).

FIG. 10 includes several back views and FIG. 11 includes several exploded views of an example UIM 800, according to some embodiments. For example, a UIM 800 may include an enclosure 1002 and a back-plate 1004. In various embodiments, the back plate 1004 is arranged to mount the UIM 800 as desired (e.g., on a surface of a wall, a surface of an appliance, etc.). In various embodiments, the form factor, including the various dimensions of the enclosure 1002 and the back-plate 1004 are designed to fit a common single-gang electrical box (e.g., from US, UK, Germany, or other countries). Further, in some embodiments, the form factor and dimensions of the enclosure 1002 and the back-plate 1004 are designed such that multiple UIM 800 can be mounted to common multi-gang frames (e.g., from US, UK, Germany, or other countries).

FIGS. 10 and 11 show views of example boards (or portions) of the example UIM 800, according to an embodiment. In an implementation, the UIM 800 includes a user interface (UI) board 1006 and a communication (e.g., radio) board 1102. In other implementations, the UIM 800 may include additional boards. Since it can be deployed independently, in various embodiments, the UIM 800 may receive power for the UI 802, the boards 1006, 1102, and other components via batteries, low-voltage wired power, or the like.

In an implementation, the UI board 1006 includes various controls, actuators, switches, etc., receives input from the UI 802 (e.g., by user interaction with the UI 802, including touching a touch screen portion, pressing a switch, sliding a finger along a portion of the UI 802, etc.), and relays the input commands to the communication board 1102 for transmission of control signals. For example, the UI board 1006 may relay the input commands to the communication board 1102, which generates signals based on the input commands and transmits them to a load control device (such as the LCM 100, for example). Additionally, the UI board 1006 may receive signals from the LCM 100 or from third party devices, and activate indicators or displays mounted to the UI board 1006 or integral to the UI 802.

In various embodiments, the communication board 1102 includes components, modules, and/or systems for wired or wireless communication with a load control device (such as the LCM 100, for example). For instance, the communication board 1102 may include a modem, a radio transceiver, infrared or ultrasonic transmission components, input/output (IO) components, and the like.

Example Combination System

Figure 12:
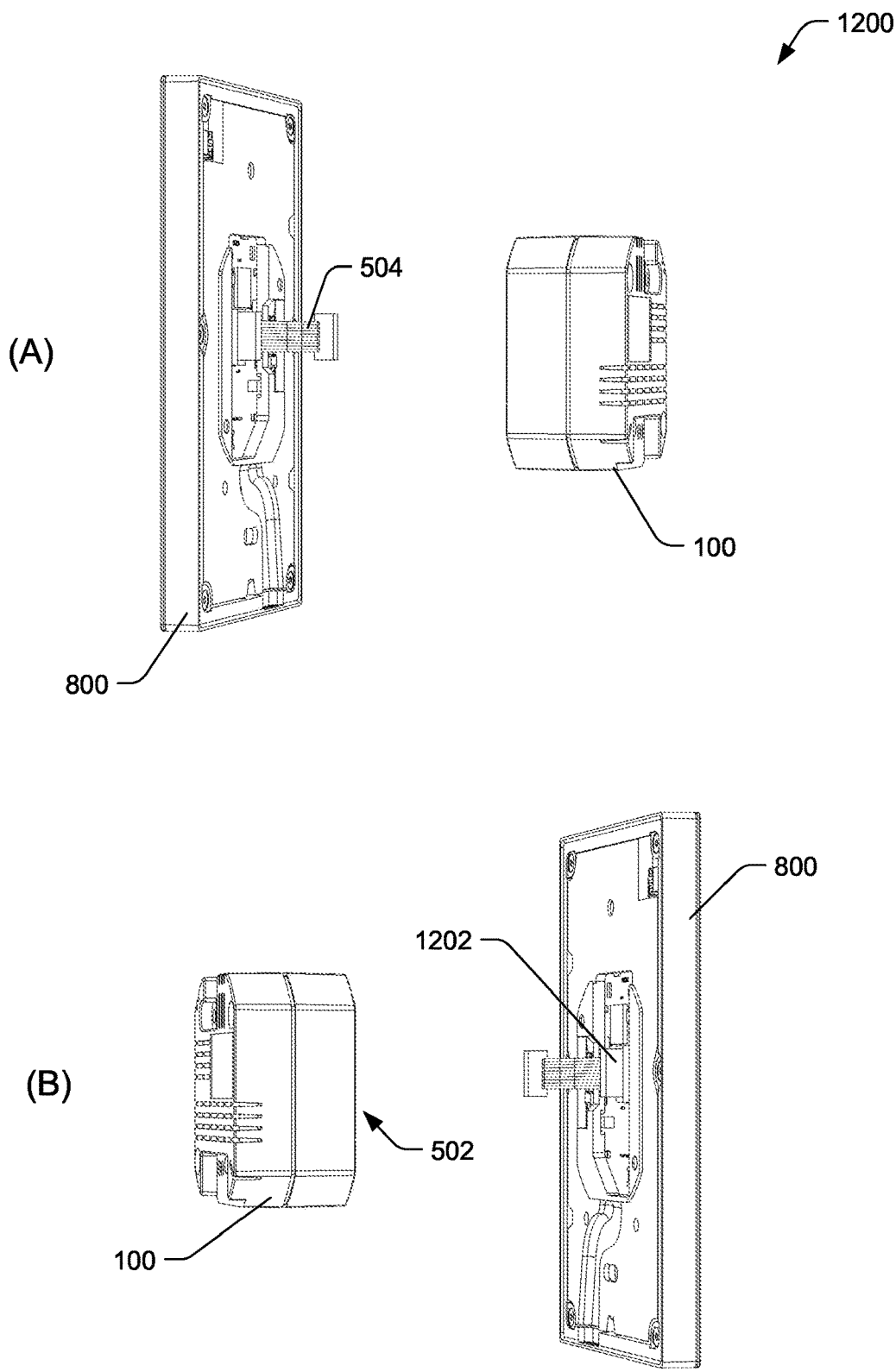
FIG. 12 includes two side perspective views of example load control modules and example user interface modules, in position to be coupled together, according to embodiments.
Figure 13:
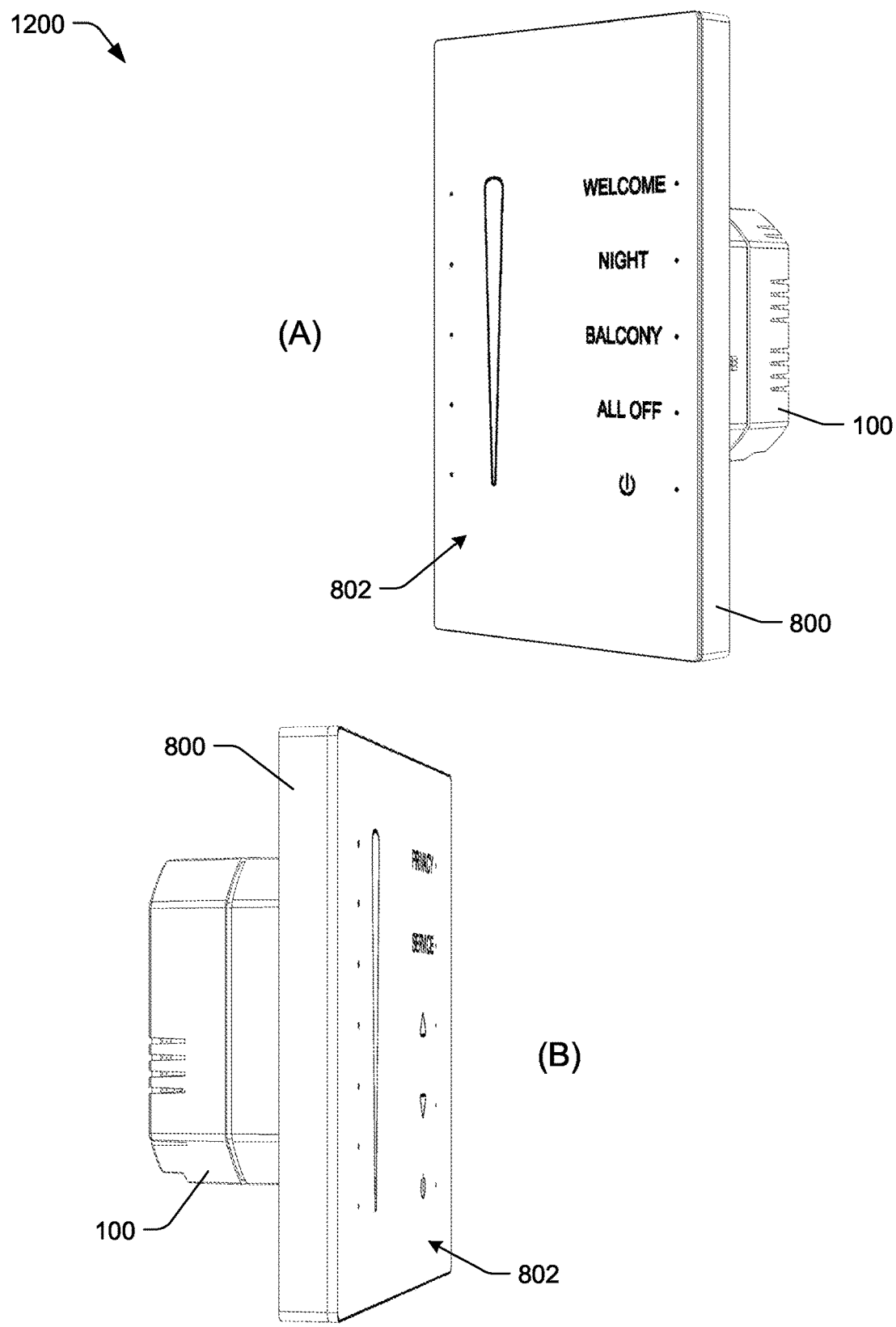
FIG. 13 includes two side perspective views of example load control modules and example user interface modules coupled together, according to embodiments.
Figure 14:
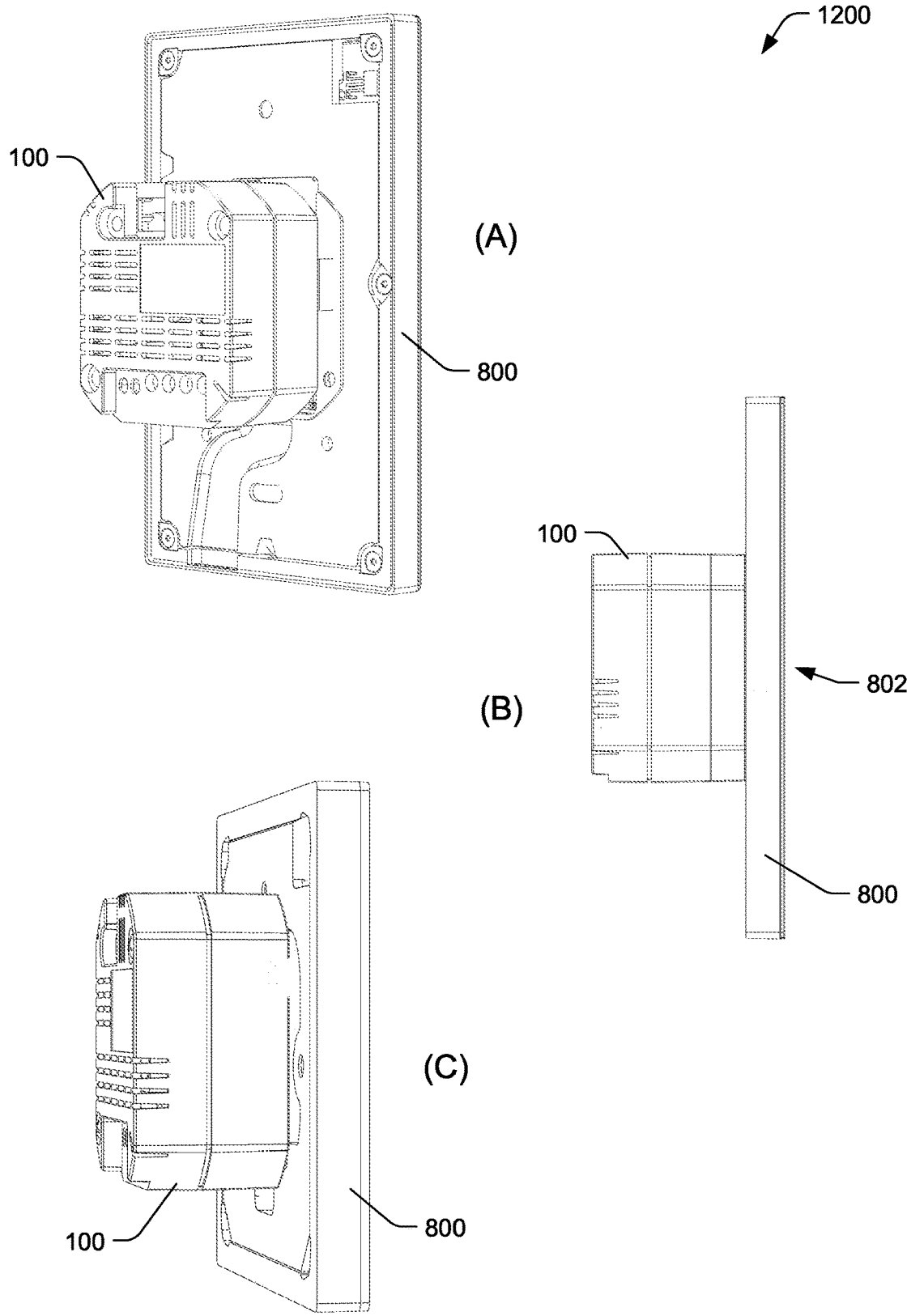
FIG. 14 includes two back perspective views and a side view of example load control modules and example user interface modules, coupled together, according to embodiments.

As shown in FIGS. 12-14, in various implementations, the LCM 100 and the UIM 800 may be coupled electrically and/or physically as a combination system 1200. For example, the UIM 800 may be employed to receive user input regarding control of an appliance, and the LCM 100 may be employed to carry out the user inputs, controlling the appliance (e.g., dimming, switching, activating, etc. the appliance). In the implementations, the UIM 800 and the LCM 100 communicate with each other using wired and/or wireless communication via the communication board 1102, the UI board 1006, the radio board 606, the VI board 604, the wire harness 504, or the like. In various embodiments, wireless connectivity between the modules 100, 800 may be made using radio, optical such as infrared, ultrasonics, or the like. In alternate implementations, the combination system 1200 may include additional or alternate modules.

In various embodiments of the system 1200, the UIM 800 and the LCM 100 may be installed coupled physically together, as shown in FIGS. 13 and 14, or the UIM 800 may be installed separately and physically independent from the LCM 100. In either type of application (with the UIM 800 and the LCM 100 physically coupled or physically separate) the UIM 800 and the LCM 100 are communicatively coupled (either via wired or wireless connection). In some embodiments of the system 1200, one of the communication board 1102 or the radio board 606 may be redundant, and may be omitted.

In various examples, as shown in FIG. 12, the UIM 800 and the LCM 100 may be electrically and/or communicatively coupled via a wiring harness 504, a harness connection (502, 1202), or the like. In one example, each of the UIM 800 and the LCM 100 includes a harness connection (such as connection 502, for example), and the wiring harness 504 couples the modules 100, 800 for signal transfer. In another example, one of the UIM 800 or the LCM 100 may include a male connector portion 502 (shown as a set of pins protruding from the LCM 100) and the other may include a female connector portion 1202 (shown in a recess on the back side of the UIM 800) that connect when the modules 100, 800 are fitted together, as shown in FIGS. 13 and 14. In other embodiments, the male and female connectors may be located in other places and on either module 100, 800, for convenience.

Different configurations for a LCM 100 and/or a UIM 800 may be possible with different implementations. In alternate implementations, various other combination systems 1200 are also within the scope of the disclosure. The variations may have fewer elements than illustrated in the examples shown in the figures, or they may have more or alternative elements than those shown.

Features and Benefits

Various features and benefits of the disclosed LCM 100, UIM 800 and/or system 1200 are listed herein. Other features and benefits will be apparent to a person having skill in the art, an electrical designer or installer, or other user.

For one example, the form factors of the LCM 100, UIM 800 and system 1200 allow the LCM 100 to be deployed worldwide in standard electrical boxes used globally. The form factor and power ratings of the LCM 100, UIM 800 and system 1200 allow installation in less classic electrical boxes as well, such as in load control centers (e.g., on a DIN rail, etc.).

For another example, using the disclosed LCM 100, UIM 800 and/or system 1200, the installer/end-user has more options in how to deploy his load controls: For example frequently the line and neutral power is wired directly to the load, and only a "switch-leg" pair carries the line voltage from the load location to the switch and back. Thus there may be no neutral wire present at the "switch" location. This arrangement may have worked fine for historical switches, but does not work so well for solid state user interfaces which require control voltage for operation.

In the past, there have been work-around systems for this type of "no-Neutral" connection, which work-arounds can work well with incandescent and halogen systems, for instance. However, these work-around systems have not worked well for LED and CFL lamps or for electronic low voltage transformers.

The modular approach of the LCM 100, UIM 800 and system 1200 allows the electrician to electrically deploy the LCM 100 and the UIM 800 as required or desired. For example, in a switch-leg situation the electrician can install the LCM 100 at or near the location of the load. Additionally, the installer can use the existing load wire (in a retrofit scenario, for example) to carry low voltage to the UIM 800. In more conventional situations the two modules (100, 800) of the system 1200 can be installed back to back, coupled physically together.

In various embodiments, the LCM 100 includes several mounting bracket options. For example, one of the mounting bracket options includes components for mounting on a DIN rail in a load control center, or the like.

For convenience, the electricians/suppliers do not have to stock all sorts of different devices for various ordinary or special case deployments, but can simply stock modular LCM 100 sets and deploy them as the occasion requires. Often the electrical installer will not know which specific wiring situation he may encounter on a job until he starts removing existing switches and fixtures. In such cases, the modular LCM 100, UIM 800, and system 1200 will provide flexibility to meet site specific conditions.

Further, because of the modularity of the LCM 100, UIM 800, and system 1200, there exists the ability to make additional hardware customizations/modifications without seeking additional safety approvals (this is possible because the UIM 800 is powered by a Class 2/SELV power output in the LCM (or by entirely external LV sources) in various embodiments).

Most multi-button keypads from other lighting control manufacturers segment their keypads into a specific maximum number of keys; say 6 horizontal buttons/keys that are arranged in a vertical column. Then, if they only need 4, they exempt 2 key caps and put in blank covers instead or not punch out breakouts in the cover. The result is that all the active keys remain at the smallest size, and the blanks create "holes" in the orderly flow of keys.

One manufacturer supplies a few different sized keycaps with their switches so that the user can do some mixing and matching, for a better look, but this solution is still not perfect, still not totally adaptable. The disclosed approach to the user interface 802 design allows the user to effectively size any button/key size and arrangement. The degree of customizability as disclosed herein is unheard of in the industry, particularly in terms of the size and quantity of buttons, sliders, indicators, and the like. This is due to the unique arrangement of control features (electronic and/or mechanical controls and indicators) behind the user interface 802.

Some typical user interface 802 designs have three vertical columns of touch sensitive area behind a façade (e.g., see FIG. 9). Each of those columns can be configured to be: a slider up and down for dimming; segmented into one or a plurality of buttons, where the segments can be arranged symmetrically, no matter the number of buttons; and the like. When you have fewer columns or row needs, then the individual buttons can grow in size and shape, if desired. In an alternative, the UI board 1006 can be segmented in a fairly unlimited matrix (e.g., a fine resolution), to create sliding wheels and other functional arrangements with finer control resolution.

If a user wants each button to be associated with a feedback LED (e.g., indicator 806), then the user can choose from a multitude of LEDs on each side in order to match the button layout.

In a further example, the disclosed LCM 100, UIM 800, and system 1200 allow for a wide range of control/communication options, including both wireless and wired serial communication and traditional 0-10V control (e.g., output from UI 802 keypad, input to LCM 100). Additionally, the LCM 100 includes a separate port for an optional plug-in relay for remote switching connection. Additionally, the UIM 800 can control load controls other than LCM 100 and the LCM 100 can be controlled by User Interfaces other than UIM 800 by virtue of the several non-proprietary communications and signal options.

CONCLUSION

While various discreet embodiments have been described throughout, the individual features of the various embodiments may be combined to form other embodiments not specifically described. The embodiments formed by combining the features of described embodiments are also within the scope of the disclosure.

The invention claimed is:

1. An apparatus, comprising:
a user interface comprising a touch keypad arranged to receive user input and to exercise control over one or more remotely controlled appliances based on the user input, the touch keypad having a preselected fixed layout and preselected capabilities out of multiple possible layouts and multiple possible capabilities of a configurable hardware infrastructure of the touch keypad,
the configurable hardware infrastructure comprising a plurality of electrical components and/or mechanical components in a predefined arrangement, that are configured once by employing one or more of the plurality of electrical components and/or mechanical components for use and rendering one or more others of the plurality of electrical components and/or mechanical components inoperative, thereby providing for multiple touch keypad options without exchanging hardware components, based on the plurality of electrical components and/or mechanical components, wherein a configuration of the hardware infrastructure is fixed after a one-time configuration; and
a communications board communicatively coupled to the hardware infrastructure and arranged to communicate one or more control signals to a remote control component or to the one or more remotely controlled appliances based on the user input and the one or more control communications.

2. The apparatus of claim 1, wherein the touch keypad includes capacitive touch control, and comprises means to define a plurality of button and slider functions that allow a user to exercise control over the one or more remotely controlled appliances with or without the interposition of an automation system.

3. The apparatus of claim 1, wherein when the touch keypad is configured into the one preselected layout, one or more of the plurality of electrical components and/or mechanical components are enabled for use and one or more others of the plurality of electrical components and/or mechanical components are disabled.

4. The apparatus of claim 1, wherein the plurality of electrical components and/or mechanical components are configurable into multiple input controls and indicators with varying quantities, sizes, and arrangements.

5. The apparatus of claim 4, wherein two or more of the electrical components and/or mechanical components can be combined to form a single input control or indicator.

6. The apparatus of claim 1, wherein the user interface is arranged to be optionally installed remotely from the remote control component and the one or more remotely controlled appliances.

7. The apparatus of claim 6, wherein the user interface includes mechanical coupling hardware to mechanically couple the user interface to an enclosure of the remote control component and electrical coupling hardware to electrically couple the user interface to the remote control component, and wherein the user interface also includes wireless communications hardware to wirelessly communicate the control signals to the remote control component when the user interface is installed remotely from the remote control component.

8. The apparatus of claim 7, wherein the wireless communications hardware is configured to wirelessly communicate using at least one of radio, optical, and ultrasonic signals.

9. The apparatus of claim 1, wherein the communications board is configured to communicate using low voltage control signals via a wired connection.

* * * * *